June 24, 1930.   J. C. HOFFMAN   1,768,405
EXPANSIBLE VEHICLE TRUNK
Filed Aug. 8, 1929   2 Sheets-Sheet 1
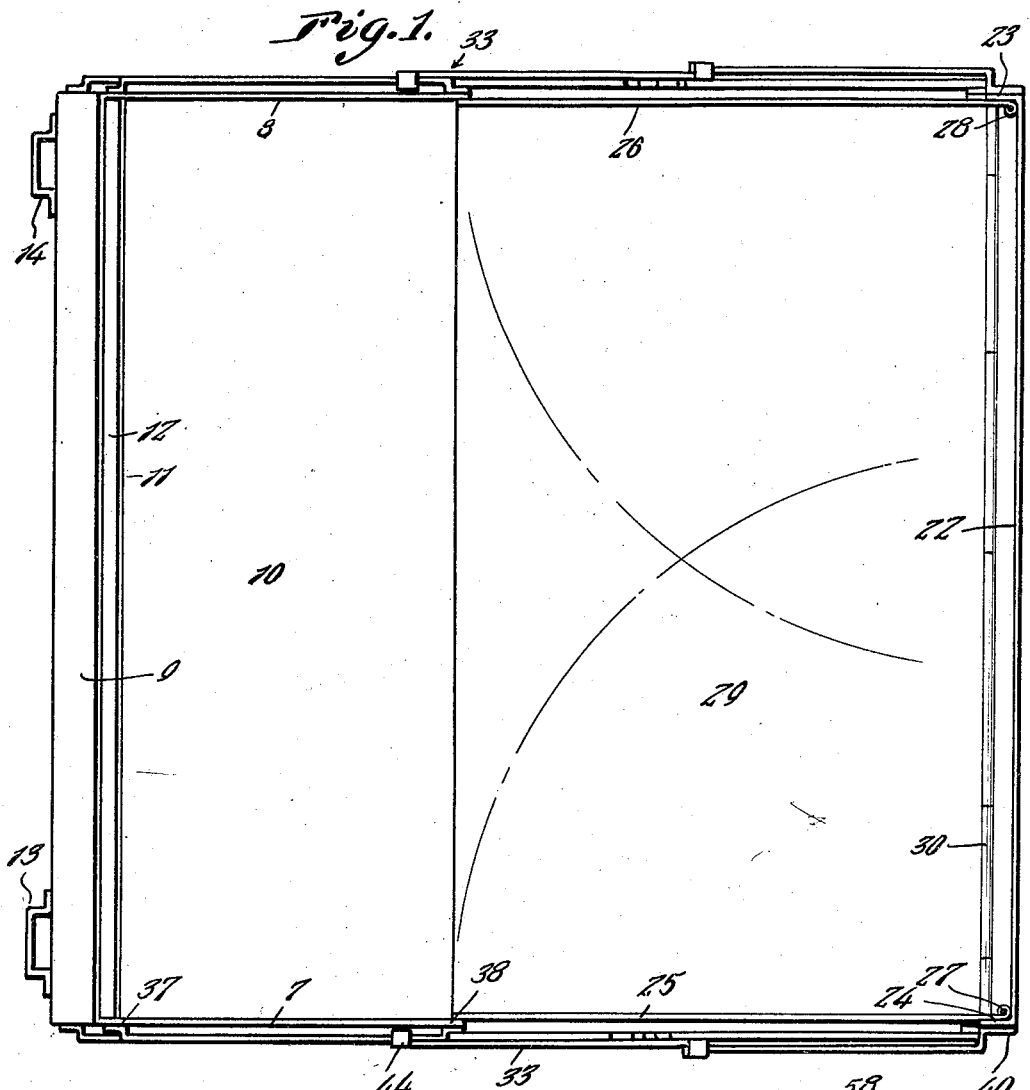
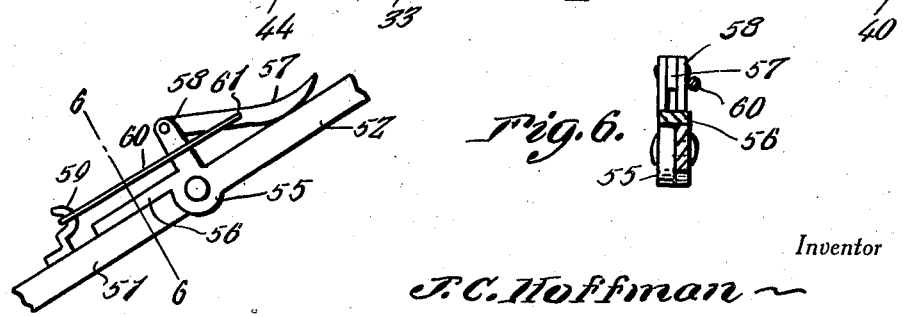
Inventor
J. C. Hoffman
By Clarence A. O'Brien
Attorney

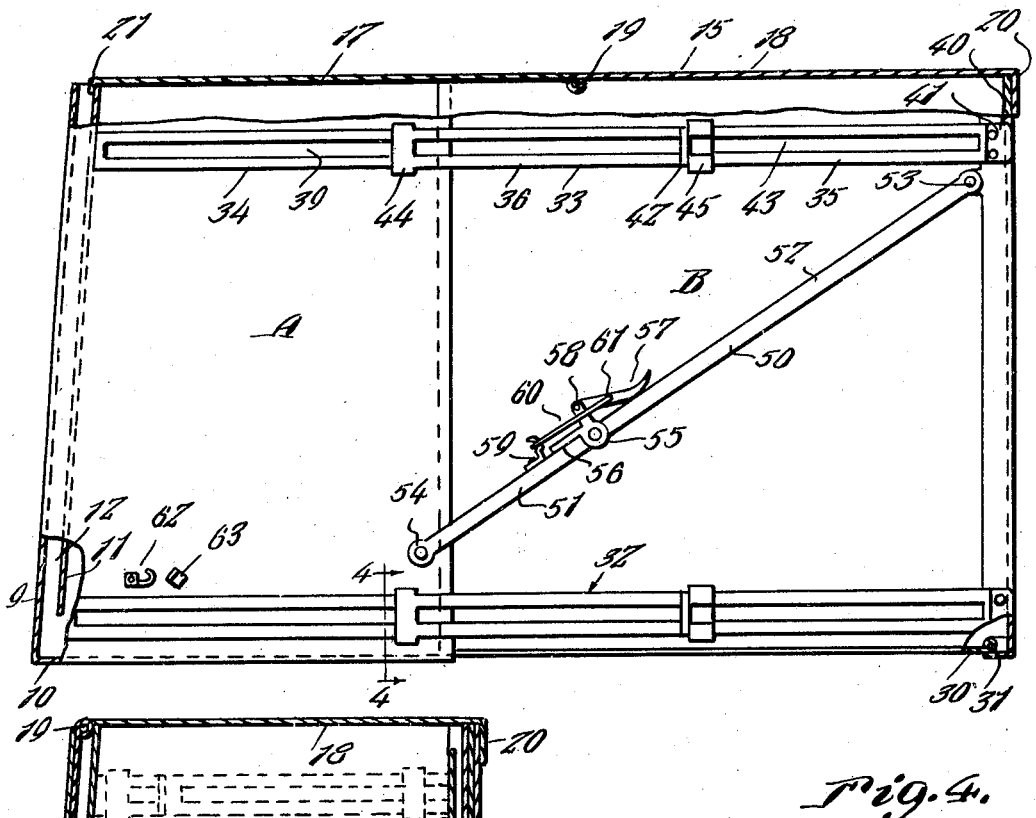

Patented June 24, 1930

1,768,405

UNITED STATES PATENT OFFICE

JOHN C. HOFFMAN, OF SIOUX CITY, IOWA

EXPANSIBLE VEHICLE TRUNK

Application filed August 8, 1929. Serial No. 384,270.

This invention relates to an expansible vehicle trunk and an object of the invention is to provide a trunk adapted to be attached to the rear portion of a vehicle for carrying luggage.

Another object of the invention is to provide a trunk that is capable of expanding and thereby increasing the area of the carrying space for the luggage.

A further object of the invention is to provide a very simple and convenient locking means for the trunk both in the expanded and collapsed position.

Further objects of the invention are to provide, in a manner as hereinafter set forth, a trunk of the character referred to, which is extremely strong, compact and durable, thoroughly reliable for its intended purpose, very simple in its method of assembly, tight and dust proof in character, and comparatively inexpensive to manufacture and install.

With the foregoing and other objects in view, the invention consists of a novel construction, combination and arrangement of parts as will be hereinafter more specifically described and illustrated, wherein is disclosed an embodiment of the invention, but it is to be understood that changes, variations or modifications may be resorted to without departing from the spirit of the claims hereunto appended.

In the drawings wherein like reference characters designate corresponding parts throughout the several views:

Figure 1 is a top plan view of the trunk in accordance with the present invention in the expanded position and having the lid removed therefrom, Figure 2 is a side elevation partly broken away of the trunk in the expanded position, Figure 3 is a side elevation, partly in section of the trunk in the folded position illustrating the manner of folding the slidable section, Figure 4 is a vertical sectional view taken substantially on line 4—4 of Figure 2, and looking in the direction of the arrows, Figure 5 is an enlarged perspective view of a portion of the sectional arms illustrating the locking means, Figure 6 is a section taken substantially on line 6—6 of Figure 5.

Referring to the drawings in detail, the trunk in accordance with the present invention consists of a fixed section A and a horizontally slidable section B. The fixed section A includes opposite side walls 7, 8, a forward wall 9 and a bottom 10 rigidly and connected together. A transverse partition wall is secured at its opposite end to the side walls 7, 8 and is slightly spaced rearwardly of the forward wall 9 coextensive in area therewith to provide a narrow compartment 12 in which the lid to be presently mentioned is folded when the trunk is in the closed position illustrated in Figure 3 of the drawings.

A pair of brackets 13, 14 are secured to the forward face of the forward wall 9 by which the trunk may be attached by any suitable means to the rear of an automobile.

The lid indicated generally at 15 and includes foldable sections 17, 18 hingedly transversely connected together as at 19. The rear section 18 of the lid is of such area as to cover the trunk when in folded position shown in Figure 3 of the drawings while when both sections are extended as is illustrated in Figure 2 of the drawings, the area of both sections are sufficient to cover the top of the trunk when it is in the extended position. The forward edge of the section 18 is formed with a downwardly depending flange 20 which is adapted to overhang the rear wall of the foldable section B. The forward edge of the section 17 is formed with a flange 21 coextensive with the partition wall 11 to overhang said upper edge and provide a dustproof cover in extended position.

When the trunk is folded to the position shown in Figure 3 of the drawings, the forward section 17 is adapted to slide into the compartment and the hinge will rest upon the upper edges of the partition wall 11 and forward wall 9 to form an airtight and dustproof joint.

Conventional locking means may be provided for securing the lid 15 to the top of the trunk both in the folded and extended position.

The foldable section B of the trunk includes a rigid rear wall 22 formed with vertically extending, inwardly directed flanges 23, 24 coextensive with each side edge thereof. A pair of foldable side walls 25, 26 fold inwardly in direction of the dotted line in Figure 1 of the vertically extending hinges 27, 28 secured to the flanges of the rear wall 22.

An upwardly folding bottom 29 is hingedly connected at its rear edge as at 30 between the side flanges 23, 24 and inwardly directed flange 31 formed on the bottom edge coextensive with the width of the rear wall 22 to cover the space between the hinge 30 and the rear wall 22, and also to provide additional supports along the horizontally disposed hinge 30 of the bottom 29.

The walls of the foldable section B are clearly shown in folded position as shown in Figure 3 of the drawings.

In order to lend support to the trunk in extended and folded position, a pair of telescoping tracks 32, 33 are formed on each side of the receptacle. The pair of tracks 32, 33 on each side of the receptacle, extend longitudinally thereof adjacent the top and bottom edge as will be clearly understood by referring to the drawings in Figures 1 and 2.

The bottom tracks on each side are designated generally at 32 and the top tracks on each side of the receptacle are designated at 33. All of the tracks are formed in the same manner and it is believed that a description of one will clearly teach the formation of the other tracks.

The tracks are formed in three sections, the forward section 34, the rear section 35 and the intermediate section 36. The forward section 34 consists of a bar raised from flanges 37, 38 on its opposite end and slotted along its longitudinal median as at 39, intermediate the flanges. The bar is secured to the side walls by hold fast means, not shown in the drawings, which extend through the walls and the said flanges.

The section 34 is rigidly secured to the side walls of the fixed section A of the trunk. The forward section 35 of the trunk is raised above a flange 40, which is secured by means of hold fast devices 41, to the side flanges of the rear wall 22. The rear end of the section 35 terminates in an outwardly directed lug stop 42.

Intermediate the lug 42 and the flange 40, the section is provided with a longitudinal slot 43. The section 35 is rigidly secured to the rear wall of the foldable section B. The intermediate section 33, is slidably supported on the forward section 34 and the rear section 35 by having a pair of oppositely directed brackets 44, 45 formed on its opposite ends.

The upper end of each bracket 44, 45 are formed with inwardly directed lips 46, 47 which overhang and slidably engage the upper edge of the respective track sections 35, 34.

The lip 46 is directly outwardly and the lip 47 is directed inwardly. The lower end of each bracket 44, 45 are provided with lips 48, 49 which overhang the lower edges of the respective track sections 35, 34. The vertical rear edge of the bracket 44 abuts the flange 38 at the end of its stroke whereby the flange is the limit stop to prevent their further extension.

The forward edge of the bracket 45 is adapted to abut the lug 42 whereby a limit stop is provided for the section 33 with respect to section 35. In folded position, the three sections 34, 35 and 36 assume the position shown in Figure 3 of the drawings whereas in the extended position, the three sections are illustrated in Figure 2 of the drawings, for the purpose of rendering additional support and for locking the trunk in the extended and folded position, a sectional, foldable arm indicated generally at 50 is placed upon each side of the trunk.

The foldable arms 50 on each side of the trunk are constructed in the same manner and attached in the same manner and it is believed that a description of the one will familiarize the art with the other. The arms are formed in two sections 51, 52, which when the trunk is in the extended position shown in Figure 2 of the drawing, extend in a diagonal direction with respect to a horizontal plane. The upper end of the outer section 52 is pivoted as at 53 to the side flange on the rigid rear wall 22, adjacent the upper end thereof. The lower section 51 is pivoted at its lower, forward end as at 54 to the rigid side wall 7 of the rigid section A, adjacent the lower rear corner thereof.

The adjacent ends of the sections 51, 52 are hingedly connected together by a hinge bracket 55. The hinge bracket 55 is formed with an outwardly projecting face 56 adapted to overlie the upper end of the lower section 51 when the trunk is in the extended position. A lever 57 is pivoted as at 58 to an upwardly directed lug on the bracket 55.

A right angled hook 59 is attached to the upper face of the lower section 51 and is adapted to be selectively engaged by a link 60 swiveled to the lever 57 as at 61. By rocking the lever 57 downwardly from the position shown in Figure 2 of the drawings, the link 60 will be detached free of the hook 59 whereby the sections will be moved upon their hinge 55.

In the position shown in Figure 2 of the drawings, the sections A, B are shown locked.

In Figure 3 of the drawing, the trunk sections are illustrated locked in the folded position.

To provide for locking the section A, B in folded position, the hook 62 is secured to the side wall of section A adjacent the lower forward corner thereof and a stop lug of right angled configuration 63 is secured to the same side wall adjacent the hook. In the latter position, when the sections 51, 52 are folded about the hinge 55, the lever 57 is rocked forwardly on its pivot, whereby the link 60 is engaged with a hook 62 and when the lever 57 is rocked backwardly on the upper section 62, the link is drawn and the projection 56 is held in tight abutment with the lug 63.

In the latter position, the trunk is locked in the folded position. It is to be understood that by describing in detail herein any particular form, structure or arrangement, it is not intended to limit myself beyond the terms of the original claims for the requirement of the prior art.

Having thus described my invention, what I claim as new is:

1. An expansible vehicle trunk comprising a receptacle including a fixed section and a slidable section, the fixed section formed of bottom and side walls rigidly secured together, a transverse partition secured to the side walls coextensive with and spaced from the forward wall to provide a compartment, a lid formed of two sections transversely hingedly connected together and the forward section adapted to be folded into the compartment when the receptacle sections are folded, said movable section including a rigid rear wall, an upwardly folding bottom wall horizontally hinged to the bottom of the rear wall, a pair of inwardly folding side walls vertically hinged to the rear wall, a telescoping track secured to the rear wall of the movable section and the side wall of the section on each side of the receptacle, a sectional arm on each side of the receptacle pivotally connected at its opposite ends to the rear wall of the slidable section and the side wall of the fixed section, the adjacent ends of the sections of the arms hingedly connected together, and latch means on the hinge connection of the arms and on one section respectively locking the arms in extended position.

2. An expansible vehicle trunk comprising a receptacle including a fixed section and a slidable section, the fixed section formed of bottom and side walls rigidly secured together, a transverse partition secured to the side walls coextensive with and spaced from the forward wall to provide a compartment, a lid formed of two sections transversely hingedly connected together and the forward section adapted to be folded into the compartment when the receptacle sections are folded, said movable section including a rigid rear wall, an upwardly folding bottom wall horizontally hinged to the bottom of the rear wall, a pair of inwardly folding side walls vertically hinged to the rear wall, a telescoping track secured to the rear wall of the movable section and the side wall of the section on each side of the receptacle, a sectional arm on each side of the receptacle pivotally connected at its opposite ends to the rear wall of the slidable section and the side wall of the fixed section, the adjacent ends of the sections of the arms hingedly connected together, and latch means on the hinge connection of the arms and on one section respectively locking the arms in extended position, and latch means on the hinge connection of the arms and on the side wall of the fixed section for locking the receptacle in folded position.

3. An expansible vehicle trunk comprising a receptacle including a fixed section and a slidable section, the fixed section formed of bottom and side walls rigidly secured together, a transverse partition secured to the side walls coextensive with and spaced from the forward wall to provide a compartment, a lid formed of two sections transversely hingedly connected together and the forward section adapted to be folded into the compartment when the receptacle sections are folded, said movable section including a rigid rear wall, a pair of inwardly folding side walls vertically hinged to the bottom of the rear wall, a telescoping track secured to the rear wall of the movable section and the side wall of the section on each side of the receptacle, a sectional arm on each side of the receptacle pivotally connected at its opposite ends to the rear wall of the slidable section and the side wall of the fixed section, the adjacent ends of the sections of the arms higedly connected together, and latch means on the hinge connection of the arms and on one section respectively locking the arms in extended position, and latch means on the hinge connection of the arms and on the side wall of the fixed section for locking the receptacle in folded position, said telescoping track comprising three sections disposed in longitudinal alinement the forward and rear sections being fixed to the fixed and slidable sections respectively and the intermediate sections slidably supported on the forward and rear track sections.

In testimony whereof I affix my signature.

JOHN C. HOFFMAN.